Figure 1:
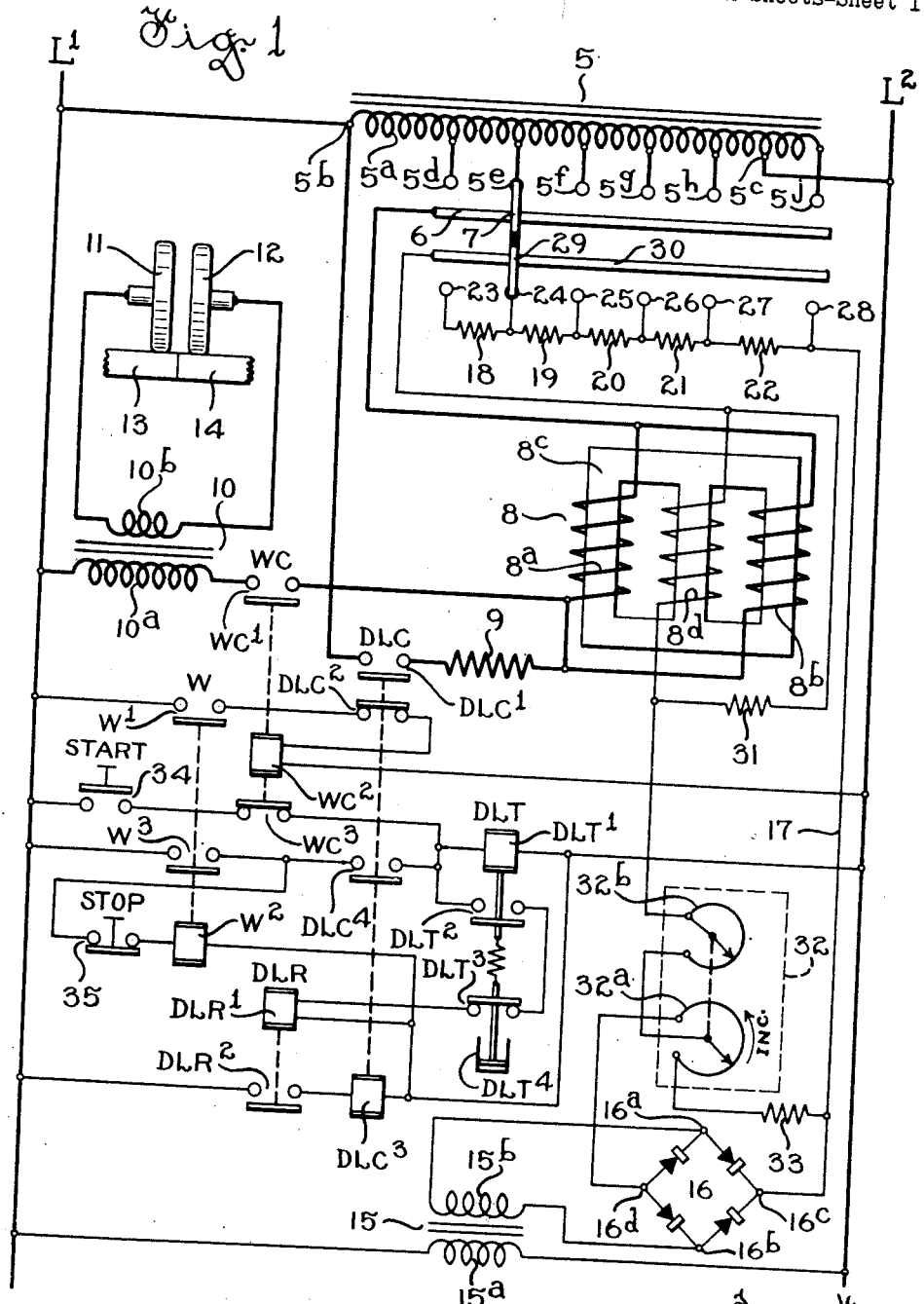

United States Patent Office 2,697,200
Patented Dec. 14, 1954

2,697,200

ALTERNATING CURRENT CONTROL SYSTEM UTILIZING SATURABLE REACTOR FOR REGULATION

Hugh E. Ball, Lakewood, Ohio, and Eric Pell, Shorewood, Wis., assignors to Cutler-Hammer, Inc., Milwaukee, Wis., a corporation of Delaware Application January 23, 1952, Serial No. 267,802

11 Claims. (Cl. 323—60)

This invention relates to alternating current control systems utilizing saturable reactors for regulation.

While not limited thereto the present invention is particularly advantageous for regulating alternating current supplied to welding transformers of resistance welders.

The use of a saturable reactor for regulation of alternating current supply to welding transformers of heavy duty seam welders has several advantages over systems employing ignitron power tubes for regulating alternating current supply. A saturable reactor is a very sturdy and stable piece of equipment with practically unlimited life. From a maintenance standpoint its long life, its lack of need for cooling water supply and its relative simplicity render it highly desirable as a means for alternating current regulation. However, a saturable reactor, being essentially an impedance device, should be matched to the welding circuit resistance for best performance. Moreover, a saturable reactor of a given size is limited to an operating range which will not unduly depress the overall power factor of the A. C. circuit. In a heavy duty seam welder handling various sizes of work it is necessary that the alternating current supplied to the welding transformer be adjustable over a wide range, and that overall power factor of the A. C. supply circuit be maintained relatively high over such range of adjustment.

A primary object of the present invention is to provide an alternating current control system employing a saturable reactor for regulation affording adjustment of alternating current over a wide range while affording maintenance of relative high power factor throughout such range of adjustment, and Another object is to provide a system of the aforementioned character wherein the saturable reactor is preloaded for a predetermined period before it is connected to the working load to insure that any residual magnetism is shaken out and the reactor is brought to substantially the stabilized magnetic conditions which would obtain under steady state conditions when connected to the working load.

Other objects and advantages of the invention will hereinafter appear.

To accompanying drawings illustrate a preferred embodiment of the invention which will be hereinafter described in detail, it being understood that the embodiment illustrated is susceptible of modification in respect of various details without departing from the scope of the appended claims.

Figure 2:
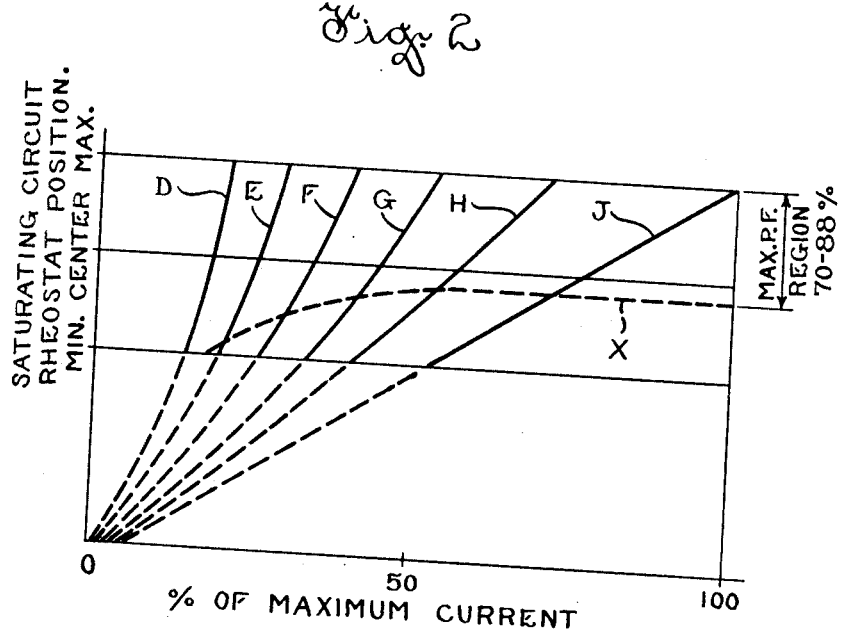

In the drawings:

Figure 1 is a diagrammatic showing of an alternating current control system constructed in accordance with the invention and as applied to a resistance seam welder, and Fig. 2 is a graph depicting certain operating characteristics obtainable with the system of Fig. 1.

In carrying out our invention, we provide for alternating current regulation over a wide range by employment of a tapped autotransformer, a saturable reactor and a tap changer operable to change the connection of the alternating current windings of the reactor to the different voltage taps of the autotransformer. Change in tap connection on the autotransformer provides course adjustment of the alternating current regulating range. For any tap connection the reactor affords stepless adjustment over a fairly wide range. Each time a change is made in the tap connection to the autotransformer, we provide a corresponding change in the amount of fixed resistance in the D. C. saturating circuit of the reactor. In other words, a preselected amount of fixed resistance in the D. C. saturating circuit is provided for each different tap connection of the autotransformer. By so doing, a substantially uniform ratio between minimum and maximum values of the A. C. current is obtained by the saturating circuit adjusting rheostat in respect of the different tap connections of the autotransformer. Without such recalibration of the D. C. saturating circuit of the reactor, proportionality between rheostat position and the alternating current would be limited to a single A. C. voltage with pregressive decrease in the power factor with decrease in D. C. saturating current and the A. C. current. The adjusting rheostat in the D. C. saturating circuit of the reactor is preferably of a compound type disclosed and claimed in the Pell application Serial No. 117,655, filed September 24, 1949. The use of a rheostat of this type, while not necessary, affords a substantially linear relationship between change in rheostat setting and change in the value of A. C. current for any amount of preselected fixed resistance.

As is well known, any inductance device exhibits a time lag in changing its flux from one value to another. Therefore before connecting the A. C. windings of the reactor to the working load, we connect these windings to a dummy load for a predetermined interval in which the alternating current can build up to substantially the final value that would obtain with the working load. This virtually eliminates any transient peaks that would attend the shaking out of residual magnetism and building up of flux in the reactor. Where the working load is a welding transformer in a seam welder this preloading of the reactor insures that it will provide stable weld heat immediately, thereby eliminating possibility of initial faulty welds.

Referring to Fig. 1, it discloses a preferred embodiment of an alternating current control system incorporating the above discussed features and as applied to the control of welding current in a resistance seam welder. More particularly, a source of alternating current is afforded by supply lines $L^1$ and $L^2$. A tapped winding $5^a$ of an autotransformer 5 has its left-hand end terminal $5^b$ connected to supply line $L^1$ and is connected through a terminal $5^c$ adjacent its right-hand end to supply line $L^2$. Winding $5^a$ is provided with voltage tap contacts $5^d$, $5^e$, $5^f$, $5^g$, $5^h$ and $5^j$. The portion of winding $5^a$ between terminal $5^c$ and tap contact $5^j$ constitutes an overhanging section affording a voltage at contact $5^j$ somewhat in excess of line voltage. Associated with the voltage tap contacts $5^d$ to $5^j$ is a tap changer comprising a stationary contact member 6 and a slidable contactor 7.

Contact member 6 is electrically connected to the upper ends of A. C. windings $8^a$ and $8^b$ of a saturable reactor 8. Windings $8^a$ and $8^b$ are respectively wound on the outer legs of a three-legged core $8^c$ of the reactor and the lower ends of these windings are connected together to the right-hand end of a resistor 9 and the right-hand contact of normally open contacts $WC^1$ of an electroresponsive switch WC. The left-hand contact of contacts $WC^1$ is connected in series with the primary winding $10^a$ of a welding transformer 10 to supply line $L^1$. Transformer 10 is provided with a secondary winding $10^b$ which is connected to the welding electrodes 11 and 12 of a resistance seam welder operating on work pieces 13 and 14. The resistor 9 is connected to the right-hand contact of normally open contacts $DLC^1$ of an electroresponsive switch DLC. The left-hand contact of contacts $DLC^1$ is connected to supply line $L^1$.

A transformer 15 has a primary winding $15^a$ connected across lines $L^1$ and $L^2$ and a secondary winding $15^b$ connected to the A. C. terminals $16^a$ and $16^b$ of a full-wave, bridge type rectifier 16. D. C. terminal $16^c$ of rectifier 16 is connected through a conductor 17 to the series connected resistors 18, 19, 20, 21 and 22. Resistor 18 is connected at its left-hand end to a commutating contact 23. The points common between resistors 18 and 19, 19 and 20, 20 and 21, and 21 and 22 are connected to commutating contacts 24, 25, 26 and 27, respectively. The right-hand end of resistor 22 is connected to commutating contact 28. Associated with the contacts 23 to 28 is a slidable contactor 29 mechanically coupled to, but electrically insulated from contactor 7, and a stationary contact member 30. Contact member 30 is connected to the upper end of the D. C. saturating winding $8^d$ of reactor 8. The upper and lower ends of winding $8^d$ are interconnected through a discharge resistor 31.

The D. C. terminal $16^d$ of rectifier 16 is connected to the upper end terminal of a resistance element of a potentiometer rheostat $32^a$, which is part of a compound rheostat set 32. The lower terminal of the resistance element of rheostat $32^a$ is connected to conductor 17 in series with a resistor 33. The adjusting element of rheostat $32^a$ is mechanically coupled to the adjusting element of a rheostat $32^b$ for concurrent adjustment therewith, and is electrically connected to the lower terminal of the resistance element of rheostat $32^b$. The adjusting element of rheostat $32^b$ is electrically connected to the point common to the lower end of winding $8^d$ of reactor 8 and resistor 31.

Rheostat set 32 is of the type disclosed in the aforementioned Pell application, having the resistance elements of rheostats $32^a$ and $32^b$ complementally formed so that for any positioning of the adjusting elements the equivalent resistance of the rheostat set in the circuit aforedescribed will be constant. Reference should be made to the aforementioned application for a more complete understanding of the design and electrical characteristics of rheostat set 32.

Switch WC has one end of its operating winding $WC^2$ connected to supply line $L^2$ at the other end thereof connectable to supply line $L^1$ through normally closed auxiliary contacts $DCL^2$ of switch DLC and normally open contacts $W^1$ of a relay W. A normally open, momentary type switch 34 is connected to line $L^1$, and is connected through normally closed contacts $WC^3$ of switch WC and operating winding $DLT^1$ of a relay DLT to line $L^2$.

Relay DLT is provided with normally open contacts $DLT^2$ which are connected through the left-hand contacts thereof to the point common to the right-hand contact of contacts $WC^3$ of switch WC and operating winding $DLT^1$. Contacts $DLT^2$ are connected through the right-hand contact thereof and normally closed contacts $DLT^3$ and operating winding $DLR^1$ of a relay DLR to line $L^2$. Contacts $DLT^3$ are provided with a time delay device $DLT^4$ affording a predetermined delay in opening of contacts $DLT^3$ following energization of operating winding $DLT^1$.

One end of operating winding $DLC^3$ of switch DLC is connected to line $L^2$ and its other end is connectable to line $L^1$ through normally open contacts $DLR^2$ of relay DLR. Relay W has an operating winding $W^2$ connected at one end to line $L^2$ and has its other end connectable to line $L^1$ through a normally closed switch 35, normally open auxiliary contacts $DLC^4$ of switch DLC, contact $WC^3$ of switch WC and switch 34. Normally open contacts $W^3$ of relay W provide a maintaining circuit for the operating winding $W^2$ through switch 35, following initial energization of winding $W^2$, and also provides a maintaining circuit for winding $DLT^1$ of relay DLT through contacts $DLC^4$ whenever the latter are closed.

It will be noted that the voltage tap contacts $5^d$ to $5^j$ of autotransformer 5 are alined respectively with the commutating contacts 23 to 28 of the series connected resistors 18 through 22, and that contactor 7 and contactor 29 are slidable on their respective contact members 6 and 30 to simultaneously engage respective alined pairs of voltage tap contacts and commutating contacts. Thus, whenever a voltage provided by a particular voltage tap of autotransformer 5 is selected, a certain preselected value of fixed resistance will be effectively connected in the D. C. saturating circuit of reactor 8. As will be appreciated, various other arrangements can be used in place of the voltage tap and resistance commutating tap changing arrangement depicted, and if desired remotely controlled motor driven means can be employed.

With contactors 7 and 29 in the position depicted in Fig. 1 voltage tap $5^e$ of autotransformer 5 will be in circuit with the A. C. windings of reactor 8, and resistors 19 through 22 will be effectively in the D. C. saturating circuit of reactor 8. Let it be assumed that the A. C. windings are connected in circuit with winding $10^a$ of welding transformer 10 as by closure of contacts $WC^1$ of switch WC (contacts $DLC^1$ of switch DLC open). Then with the value of fixed resistance in the D. C. saturating circuit afforded by resistors 19 through 22, the alternating current supplied to winding $10^a$ can be adjusted throughout a range depicted by the solid line portion of curve E in Fig. 2 by adjustment of rheostat set 32 throughout its range of adjustment. It will be noted that the change in value of A. C. current is substantially directly proportional to change in setting of rheostat set 32.

The solid portion of curve D depicts the range of possible adjustment of A. C. current when contactors 7 and 29 are in engagement with tap contact $5^d$ and commutating contact 23, respectively, the solid portion of curve F the range of possible adjustment of A. C. current when contactors 7 and 29 are in engagement with tap contacts $5^f$ and commutating contact 25, respectively, and the solid portions of curve G the range of possible adjustment when contactors 7 and 29 are in engagement with tap contact $5^g$ and commutating contact 26, respectively. Similarly, the solid portion of curve H depicts the range of possible adjustment of A. C. current while contactors 7 and 29 are in engagement with tap contact $5^h$ and commutating contact 27, respectively, and the solid portion of curve J the range of possible adjustment with contactors 7 and 29 in engagement with tap contact $5^j$ and commutating contact 28, respectively. As previously mentioned in connection with curve D, such range of adjustments depicted by the curves D, F, G, H and J is obtained with adjustment of rheostat set 32 throughout its range of adjustment.

As a practical consideration in the operation of seam welders it is desirable to keep a high overall power factor of the A. C. circuit and the region above the broken line curve X in Fig. 2 indicates a power factor of 70–88 per cent. Thus, with suitable choice of a voltage tap on autotransformer 5 and suitable adjustment of rheostat set 32 it is possible to provide the desired value of current in the A. C. circuit while maintaining the overall power factor of such A. C. circuit in such region, and still permit adjustment of the value of the A. C. current over a wide range.

Adjustments of contactors 7 and 29 to the various associated voltage tap contacts and commutating contacts is of course done with the A. C. windings of reactor 8 disconnected from the load. As aforeindicated, it is a feature of our invention that the A. C. windings are initially connected to a dummy load for a predetermined interval prior to connection to the working load as will now be described in detail.

Upon momentary closure of switch 34 current flows from line $L^1$ through switch 34, the then closed contacts $WC^3$ of switch WC and the operating winding $DLT^1$ of relay DLT to line $L^2$. Contacts $DLT^2$ of relay $DLT^1$ immediately close, and an energizing circuit is completed through contacts $DLT^2$, the closed contacts $DLT^3$ and the operating winding $DLR^1$ of relay DLR to line $L^2$. Consequently, contacts $DLR^2$ close to complete an energizing circuit for operating winding $DLC^3$ of switch DLC across lines $L^1$ and $L^2$. Contacts $DLC^1$ and $DLC^4$ thereupon close and contacts $DLC^2$ open.

Closure of contacts $DLC^1$ provides connection of the lower ends of A. C. windings $8^a$ and $8^b$ of reactor 8 to line $L^1$ in series with dummy load resistor 9. Closure of contact $DLC^4$ completes an energizing circuit for the operating winding $W^2$ of relay W, from line $L^1$ through switch 34, the closed contacts $WC^3$ of relay WC, switch 35 and operating winding $W^2$ of relay W to line $L^2$. Contacts $W^1$ and $W^3$ of relay W thereupon close. Closure of contacts $W^3$ provides a maintaining circuit for winding $W^2$ of relay W and the winding $DLT^1$ of relay DLT through the then closed contacts $DLC^4$ of relay DLC.

After a predetermined interval, as determined by the time delay device $DLT^4$, contacts $DLT^3$ open, thereby interrupting the energizing circuit for winding $DLR^1$ of relay DLR. Consequently contacts $DLR^2$ open, interrupting the energizing circuit for winding $DLC^3$ of switch DLC. As a result contacts $DLC^1$ and $DLC^4$ open and contacts $DLC^2$ close. An energizing circuit for operating winding $WC^2$ of relay WC is thereby completed from line $L^1$ through the then closed contacts $W^1$ of relay W, the closed contacts $DLC^2$ and winding $WC^2$ to line $L^2$. Contacts $WC^1$ thereupon close while contacts $WC^3$ open. The opening of contacts $DLC^1$ interrupts the connection of A. C. winding 8a and 8b of reactor 8 through dummy load resistor 9 to line L¹, and the closing of contacts WC¹ connects these windings in series with the primary winding 10a of welding transformer 10 to line L¹. Opening of contacts WC³ insures deenergization of winding DLT¹ of relay DLT in the event that switch 34 is maintained closed or reoperated.

When it is desired to stop the flow of current through winding 10a of transformer 10, switch 35 is opened, thereby interrupting the energizing circuit for winding W² of relay W. As a result contacts W¹ and W³ open. Opening of contact W¹ interrupts the energizing circuit for winding WC² of relay WC and consequently contacts WC¹ open and contacts WC³ close. Opening of contacts W³ interrupts the maintaining circuit for winding W² of relay W.

We claim:

1. In an alternating current regulating system, in combination, means affording a source of a plurality of different alternating voltage values, a saturable reactor, means for supplying the saturating winding of said reactor with adjustable direct current, resistance means, and means for selectively connecting the A. C. windings of said reactor to the different values of alternating voltage of said source and simultaneously effecting connection of preselected amounts of said resistance means in series with said saturating winding in accordance with the alternating voltage value selected for said A. C. windings.

2. In an alternating current regulating system, in combination, means including a transformer winding having a plurality of voltage taps providing a corresponding number of different alternating voltages, a saturable reactor, means including rheostat means for supplying the saturating winding of said reactor with adjustable direct current, resistance means, and means for selectively connecting the A. C. windings of said reactor to the different voltage taps of said transformer windings and simultaneously effecting connection of preselected amounts of said resistance means in series with said saturating winding in accordance with the alternating voltage selected for said A. C. windings.

3. In an alternating current regulating system, in combination, means including a transformer winding having a plurality of voltage taps providing a corresponding number of different alternating voltages, a saturable reactor, means including rheostat means for supplying the saturating winding of said reactor with adjustable direct current, a plurality of resistors having different resistance values, and means for selectively connecting the A. C. windings of said reactor to the different voltage taps of said transformer winding and simultaneously effecting series connection of preselected ones of said resistors in circuit with said saturating winding in accordance with the alternating voltage selected for said A. C. windings.

4. The combination with a translating device to be supplied with regulable alternating current, of a saturable reactor, means for connecting the A. C. windings of said reactor in circuit with said translating device, means including a tapped autotransformer providing a plurality of different alternating voltages, means including rheostat means for supplying the saturating winding of said reactor with adjustable direct current, a plurality of resistors having different resistance values, and means for selectively connecting said A. C. windings to the different taps of said autotransformer and simultaneously effecting series connection of preselected ones of said resistors in circuit with said saturating winding in accordance with the alternating voltage selected for said A. C. windings.

5. The combination with a translating device to be supplied with regulable alternating current, of a saturable reactor, means for connecting the A. C. windings of said reactor in circuit with said translating device, means including a tapped autotransformer providing a plurality of different alternating voltages, means including rheostat means for supplying the saturating winding of said reactor with adjustable direct current, a plurality of series connected resistors of different resistance values, a plurality of commutating contacts in circuit with said resistors and exceeding by one the number of resistors, means operable to selectively connect the different voltage taps of said autotransformer in circuit with said A. C. windings of said reactor, and means operable by the last mentioned means for effecting through engagement with said commutating contacts connection of preselected ones of said resistors in circuit with said saturating winding in accordance with the alternating voltage selected for said A. C. windings.

6. The combination with a translating device to be supplied with regulable alternating current, of a saturable reactor, means for connecting the A. C. windings of said reactor in circuit with said translating device, means including a tapped autotransformer providing a plurality of different alternating voltages, a plurality of resistors having different ohmic values, means for selectively connecting said A. C. windings to different taps of said autotransformer and simultaneously effecting series connection of preselected ones of said resistors in circuit with the saturating winding of said reactor in accordance with the alternating voltage selected for said A. C. windings, and means including a compound type rheostat in circuit with said saturating winding for supplying the latter with adjustable direct current, said rheostat comprising separate rheostat resistors and individual adjusting elements for the respective rheostat resistors interconnected for effecting adjustments of said rheostat resistors simultaneously, one of said rheostat resistors and its adjusting element affording a potentiometer type rheostat and the other rheostat resistor being series related to said one of said rheostat resistors selectable by the adjusting element thereof and said other of said rheostat resistors being appropriately tapered so that for all settings of its adjusting element and all amounts of fixed resistance in said saturating circuit of said reactor said compound rheostat will have constant equivalent resistance.

7. In combination, a welding transformer, a saturable reactor, means for connecting the A. C. windings of said reactor in circuit with the primary winding of said welding transformer, means including a tapped autotransformer providing a plurality of different alternating voltages, means including rheostat means for supplying the saturating winding of said reactor with adjustable direct current, a plurality of resistors having different ohmic values, and means for selectively connecting said A. C. windings to the different taps of said autotransformer and simultaneously effecting series connection of preselected ones of said resistors in circuit with said saturating winding in accordance with the alternating voltage selected for said A. C. windings.

8. The combination with a translating device to be supplied with regulable alternating current and a source of alternating voltage, of inductive current regulating means, means affording connection of said regulating means in circuit with said source, means constituting a dummy load, and means including control means operable to connect said regulating means in circuit with said dummy load for a predetermined interval and thereafter connect said regulating means in circuit with said translating device, to insure magnetic stabilization of said regulating means prior to its connection in circuit with said translating device.

9. The combination with a translating device to be supplied with regulable alternating current and a source of alternating voltage, of a saturable reactor, means affording connection of the A. C. windings of said reactor in circuit with said source, means including adjustable means for supplying the saturating winding of said reactor with adjustable current, means constituting a dummy load, and means including control means operable to initially connect said A. C. windings in circuit with said dummy load for a predetermined interval and thereafter connect said A. C. windings in circuit with said translating device, to insure magnetic stabilization of said reactor prior to its connection in circuit with said translating device.

10. The combination with a translating device to be supplied with regulable alternating current and a source of alternating voltage, of a saturable reactor, means affording connection of the A. C. windings in circuit with said source, means including adjustable means for supplying the saturating winding of said reactor with adjustable direct current, means constituting a dummy load, an electroresponsive switch energizable to connect said A. C. windings in circuit with the dummy load, a second electroresponsive switch energizable to connect said A. C. windings in circuit with said translating device, a relay having time delay means, said relay being energizable to complete an energizing circuit for the first mentioned switch and following a predetermined interval acting to interrupt the energizing circuit for said first mentioned switch and complete an energizing circuit for said second switch, and means operable to energize and deenergize said relay.

11. In combination, a welding transformer, means including a tapped autotransformer providing a source of a plurality of different alternating voltages, a saturable reactor, a plurality of resistors having different resistance values, means for selectively connecting the A. C. windings to different taps of said autotransformer and simultaneously effecting series connection of preselected ones of said resistors in circuit with the saturating winding of said reactor in accordance with the alternating voltage selected for said A. C. windings, means including rheostat means in circuit with said saturating winding for supplying the latter with adjustable direct current, means constituting a dummy load, and means including control means operable to initially connect said A. C. windings in circuit with said dummy load for a predetermined interval and thereafter connect said A. C. windings in circuit with said transformer.

References Cited in the file of this patent
UNITED STATES PATENTS

| Number | Name | Date |
|---|---|---|
| 1,820,242 | Niemann et al. | Aug. 25, 1931 |
| 2,440,319 | Wickerham | Apr. 27, 1948 |
| 2,547,615 | Bedford | Apr. 3, 1951 |